United States Patent
Lemmonier et al.

(10) Patent No.: US 6,779,779 B2
(45) Date of Patent: Aug. 24, 2004

(54) FAUCET WITH SECONDARY OPENING

(75) Inventors: Thierry Lemmonier, Gasny (FR); Serge LeGrand, Notre Dame de l'Isle (FR)

(73) Assignee: SNECMA Moteurs, Paris (FR)

( * ) Notice: Subject to any disclaimer, the term of this patent is extended or adjusted under 35 U.S.C. 154(b) by 92 days.

(21) Appl. No.: 10/275,986

(22) PCT Filed: May 23, 2001

(86) PCT No.: PCT/FR01/01595
§ 371 (c)(1),
(2), (4) Date: Nov. 20, 2002

(87) PCT Pub. No.: WO01/90613
PCT Pub. Date: Nov. 29, 2001

(65) Prior Publication Data
US 2004/0021115 A1 Feb. 5, 2004

(30) Foreign Application Priority Data
May 24, 2000 (FR) .............................. 00 06612

(51) Int. Cl.$^7$ .............................. F16K 5/12; F16K 5/10
(52) U.S. Cl. ...................................... 251/207; 251/209
(58) Field of Search .................................. 251/205–209, 251/304–317.01

(56) References Cited

U.S. PATENT DOCUMENTS

| | | | | | |
|---|---|---|---|---|---|
| 1,825,512 A | * | 9/1931 | Durham et al. | .............. | 251/207 |
| 2,621,012 A | * | 12/1952 | Graham | ...................... | 251/207 |
| 3,386,461 A | * | 6/1968 | Fisher | ........................ | 137/237 |
| 3,656,711 A | * | 4/1972 | Toelke | ........................ | 251/151 |
| 4,655,078 A | * | 4/1987 | Johnson | ...................... | 73/168 |
| 5,305,986 A | * | 4/1994 | Hunt | .......................... | 251/207 |

* cited by examiner

Primary Examiner—Paul J. Hirsch
(74) Attorney, Agent, or Firm—Bacon & Thomas PLLC

(57) ABSTRACT

The valve device (1) includes a valve body (2) defining a fluid flow duct (30) having a plug (20) disposed therein, the plug having a main flow opening (21) and being movable between a first position in which the main flow opening co-operates with the flow duct, and a second position in which the plug closes the duct. The plug further includes secondary flow means (22) offset relative to the main flow means and enabling the hydraulic characteristic of the valve device to be controlled.

15 Claims, 4 Drawing Sheets

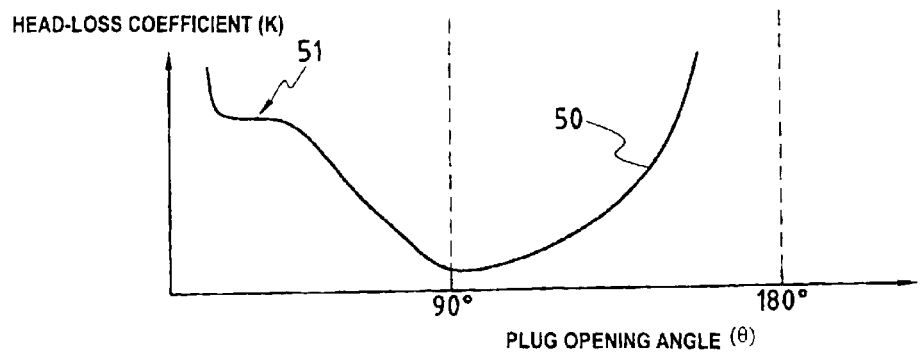
FIG.6
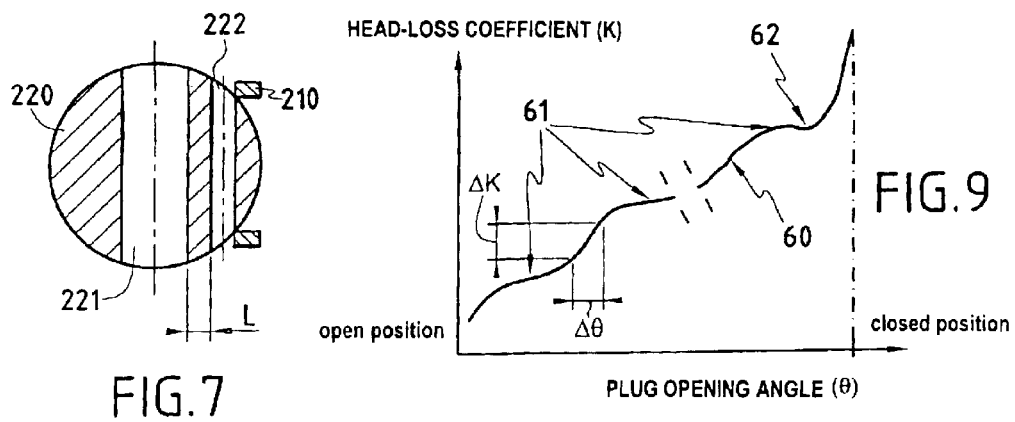
FIG.7
FIG.9
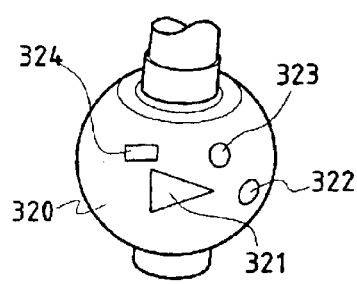
FIG.8
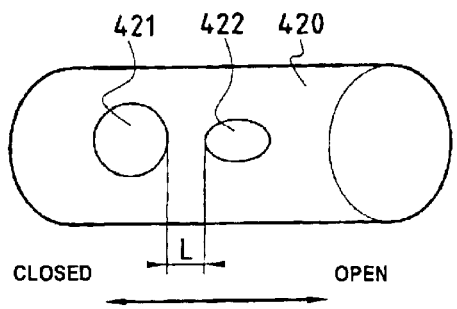
FIG.10

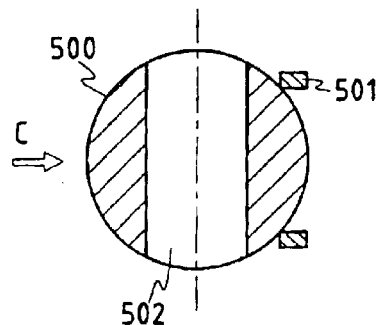 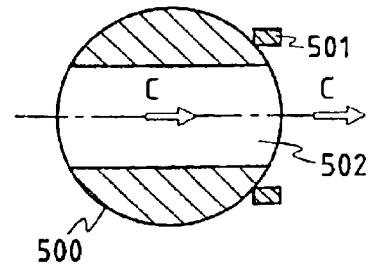
FIG.11A
PRIOR ART
FIG.11B
PRIOR ART
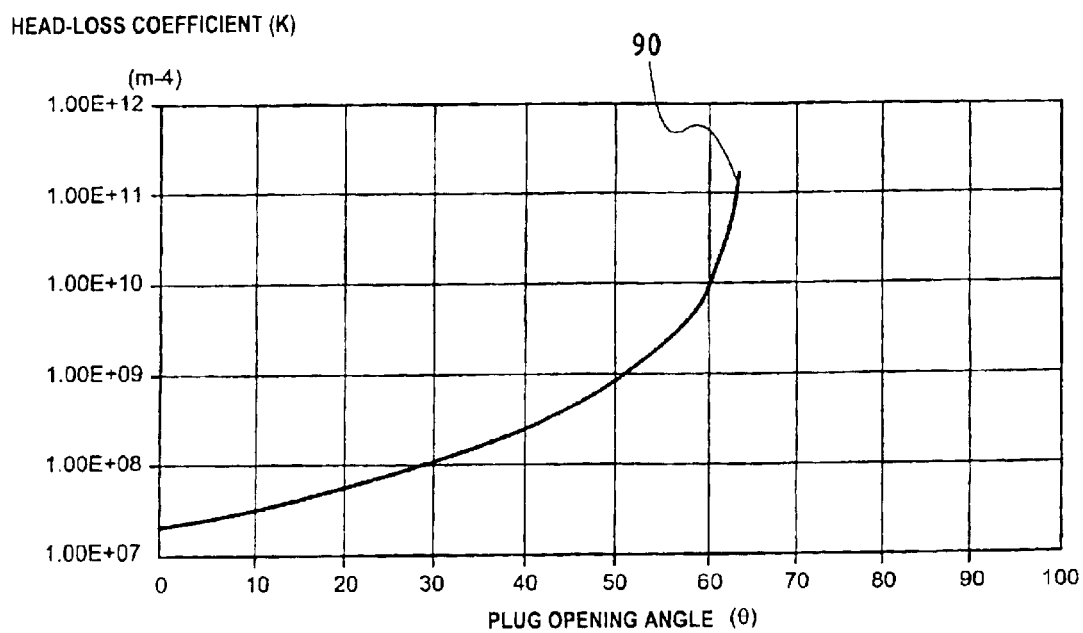
FIG.12
PRIOR ART

FAUCET WITH SECONDARY OPENING

FIELD OF THE INVENTION

The present invention relates to a valve device of the plug valve type. This type of valve has a plug which closes the duct of a pipe when the valve is in the closed position and which has an opening for co-operating with said duct when the valve is in the open position.

PRIOR ART

Amongst conventional plug type valve devices, the use of a valve having a plug which is spherical, for example, is widespread, in particular because of the simplicity with which it can be made and because of its reliability. FIG. 11A is a section view showing a spherical or ball valve device in the closed position. Sealing between a plug 500 and a valve body (not shown) is provided by an annular gasket 501 which co-operates with both of those two elements. In this position, a fluid flow opening 502 in the plug lies substantially perpendicular to the fluid flow direction represented by arrow C, i.e. away from the passage defined by the gasket 501. FIG. 11B shows the same valve device in an open position. In this position, the opening 502 is in alignment with the fluid flow direction along the duct, thus allowing fluid to flow from upstream to downstream in the duct.

For a ball valve as described above, FIG. 12 gives the hydraulic characteristic, i.e. the head loss coefficient of the valve as a function of the angle to which its plug is opened. From this figure, it can be seen that the appearance of the head loss curve 90 is characterized by a sudden drop in head loss coefficient during the initial instants of opening. The head loss coefficient K is expressed by the following relationship:

$$K = \frac{\rho \Delta P}{Qm^2}$$

where r is the density of the fluid, DP the head loss, and Qm the mass flow rate.

Thus, with that type of configuration, it is difficult to control head loss accurately while opening the plug, and as a result fluid flow rate is characterized solely by two states with practically no transition between them: an OFF state (maximum head loss) in the closed position so long as the opening in the plug has not moved beyond the gasket, and an ON state (minimum head loss) where the head loss coefficient drops suddenly as soon as the opening in the plug begins to go beyond the gasket.

OBJECT AND BRIEF SUMMARY OF THE INVENTION

The present invention seeks to remedy the above-mentioned drawbacks and to provide a plug type valve device which enables its hydraulic characteristics to be controlled so as to obtain a plurality of flow stages.

These objects are achieved by a valve device comprising a valve body defining fluid flow duct, said duct having an upstream portion and a downstream portion between which there is disposed a plug having a main flow opening, the plug being movable between a first position in which the main flow opening co-operates with the flow duct, and a second position in which the plug closes said duct, the device being characterized in that it has a single annular gasket providing sealing between the duct and the outside wall of the plug, and in that said plug further includes at least one secondary flow means (also called secondary flow arrangement herein) offset relative to said main flow opening so that when said plug is in an intermediate position between the open and closed positions, fluid flows along the duct by penetrating directly through the main flow opening beside the upstream portion of the duct and leaving via said secondary flow means beside the downstream portion of the duct.

Thus, the present invention proposes a valve device which makes it simple and inexpensive to adapt the hydraulic characteristic of a plug type valve so as to obtain a plurality of flow stages.

The annular gasket may be placed either between the outside wall of the plug and the downstream portion of the duct, or between the outside wall of the plug and the upstream portion of the duct.

More specifically, the secondary flow means are of shape and size that are calibrated as a function of the desired level of head loss.

In this way, the level of head loss in each flow stage can be determined by the shape and size of the secondary flow means.

More particularly, the value of the spacing between said secondary flow means and said main flow opening in the travel plane of the plug is a function of the duration of the flow stage produced via the secondary flow means.

Consequently, during displacement of the plug between a closed position to an open position, or vice versa, the length of the flow stage produced by the secondary flow means can be controlled by the value of the spacing between said means and the main opening.

In a second embodiment of the invention, the secondary flow means comprise an opening placed between the outside surface of the plug and the cavity defined by the main flow opening.

In another embodiment of the invention, the secondary flow means comprises first and second openings disposed between the outside surface of the plug and the cavity defined by the main flow opening, the first and second openings being substantially in alignment on an axis defined by the diameter of the plug.

In yet another embodiment of the invention, the secondary flow means comprises at least one opening offset by a length parallel to the main flow opening of the plug.

Still in another embodiment of the invention, the secondary flow means comprises a plurality of openings disposed between the outside wall or surface of the plug and the cavity defined by the main flow opening.

In an aspect of the present invention, the secondary flow means is disposed in a plane that is inclined relative to the plane defined by the main flow opening.

In an aspect of the invention, the valve device has sealing means disposed between the outside surface of the plug and the duct.

In a particular aspect of the invention, the plug is spherical, cylindrical, or conical in shape.

According to a characteristic of the invention, the device includes drive means for turning the plug to move said plug between an open position and a closed position.

More particularly, the plug drive means turn said plug to rotate continuously in the same direction.

According to another characteristic of the invention, the plug moves in linear translation between an open position and a closed position.

The valve device as defined above may be applied to a liquid flow duct.

BRIEF DESCRIPTION OF THE DRAWINGS

Other characteristics and advantages of the invention appear from the following description of particular embodiments of the invention given as non-limiting examples, with reference to the accompanying drawings, in which:

FIG. 6 is a graph showing hydraulic characteristics of the valve device in a second embodiment of the invention;

FIG. 7 is a diagrammatic section view showing a plug in a third embodiment of the invention;

FIG. 8 is a diagrammatic view of a spherical plug constituting a fourth embodiment of the invention;

FIG. 9 is a graph showing hydraulic characteristics of the valve device in a fourth embodiment of the invention;

FIG. 10 is a diagrammatic view of a plug for a linear type valve device in a fifth embodiment of the invention;

FIGS. 11A and 11B are diagrammatic longitudinal section views of a prior art plug in the open position and in the closed position; and FIG. 12 is a graph showing a hydraulic characteristic of a prior art plug type valve device.

DETAILED DESCRIPTION OF EMBODIMENTS OF THE INVENTION

In order to avoid pointlessly complicating the description of embodiments of the present invention, these embodiments are described essentially with reference to a valve device having a spherical plug. Nevertheless, it can clearly be seen that the present invention applies to any type of valve device having a duct that is opened and closed by moving a shutter or plug.

Furthermore, the valve device of the invention has only one annular gasket for providing sealing between the plug and the duct of the valve. Still for reasons of simplification, the characteristics of the present invention are described below with reference to plug valves in which the gasket defines a sealed limit and is placed between the downstream portion of the duct and the outside wall of the plug. Nevertheless, on reading the description below, the person skilled in the art will have no difficulty in implementing the invention with a valve in which the annular gasket is disposed between the outside wall of the plug and the upstream portion of the duct.

Figure 1:
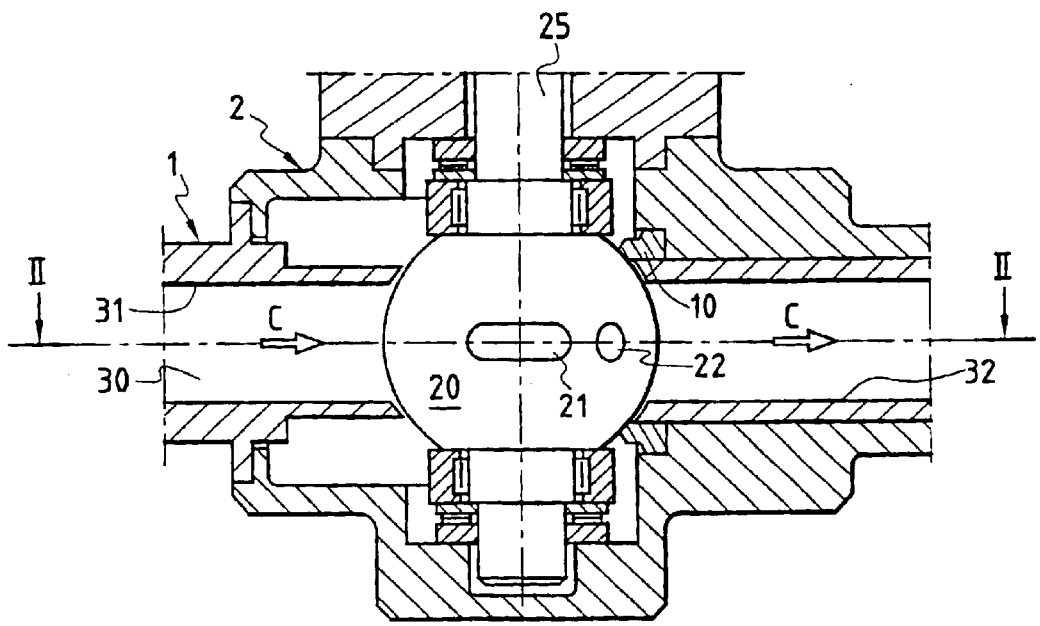
FIG. 1 is a diagrammatic cross-section view of a valve device constituting a first embodiment of the invention.

In a first embodiment of the invention, FIG. 1 shows a valve 1 which comprises valve body 2 defining a fluid flow duct 30. The duct 30 has an upstream portion 31 and a downstream portion 32 separated by a plug 20. The plug 20 has a main flow opening 21 which is designed to co-operate with the duct in an open position so as to allow fluid to flow from the upstream portion 31 to the downstream portion 32, as represented by arrow C. In the closed position as shown in FIG. 1, the opening 21 is substantially perpendicular to the axis along which fluid flows in the duct, thereby preventing fluid from passing from the upstream portion 31 to the downstream portion 32 of the duct. In order to provide complete sealing between the portions of the duct, an annular gasket 10 which is secured to the valve body 10 is maintained in contact against the outside wall or surface of the plug when it is in the closed position. The annular gasket 10 thus forms a sealing boundary or limit between the upstream and downstream portions of the duct. As shown in FIG. 1, the gasket 10 is located beside the downstream portion 32 of the duct. It could equally well be placed beside the upstream portion 31 of the duct so as to form the sealing limit with the plug. The plug 20 is secured to a pivot shaft 25 for turning the plug back and forth between a shut position (closed position) in which the opening 21 lies outside the inside space defined by the gasket, and a position in which the opening 21 is in alignment with the duct 30 (open position) where one of the ends of the opening lies inside the inside space of the gasket. The pivot shaft 25 is driven by an actuator (not shown) which can be controlled manually, electrically, pneumatically, or hydraulically.

Figure 2:
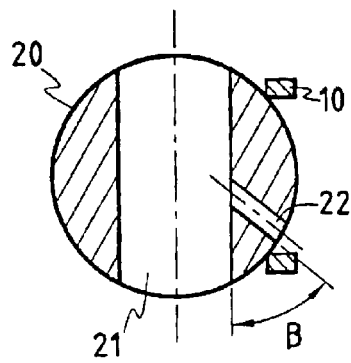
FIG. 2 is a diagrammatic section view on plane II—II of FIG. 1 showing a valve device plug in a first embodiment of the invention.

In the valve device of the invention shown in FIG. 1, the plug 20 also has a secondary flow opening 22 which is formed between the outside surface of the plug and a channel formed by the main opening 21. FIG. 2 is a section view through the plug 20 of the invention. In this embodiment, the secondary opening 22 forms an angle b with the main opening 21. In this case, the secondary opening 22 is placed in the same horizontal plane as the opening 21 and, in the opening direction of the plug, it lies closer to the sealing limit defined by the annular gasket 10 than does the main opening 21. This secondary opening may present a very wide variety of shapes and sizes depending on the desired hydraulic characteristics. Nevertheless, it is preferable for the size of this secondary opening to be considerably smaller than the size of the main opening so as to avoid excessive instantaneous head losses.

With the plug 20 comprising a main opening 21 and a secondary opening 22 placed in offset manner as shown in FIGS. 1 and 2, three stages A, B, and C of fluid flow are obtained when the plug is moved. These stages and the operation of the device of the invention are described with reference to FIGS. 3A to 3C and with reference to FIG. 4 in which the curve 40 shows the hydraulic characteristic. The curve 40 shown in FIG. 4 corresponds to the head loss observed through the valve device constituting the first embodiment of the invention as a function of the opening angle q of the plug. The values taken by the angle q lie in the range 80°–90° (closed position of the plug) to 0° (open position of the plug). The travel direction of the plug during these stages is represented by arrow S which shows the plug, and consequently the valve, being opened.

Figure 3A:
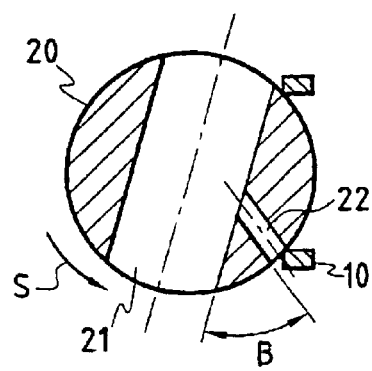
FIGS. 3A, 3B, and 3C are diagrammatic section views on plane II—II of FIG. 1 showing a plug in different positions in a first embodiment of the invention.
Figure 4:
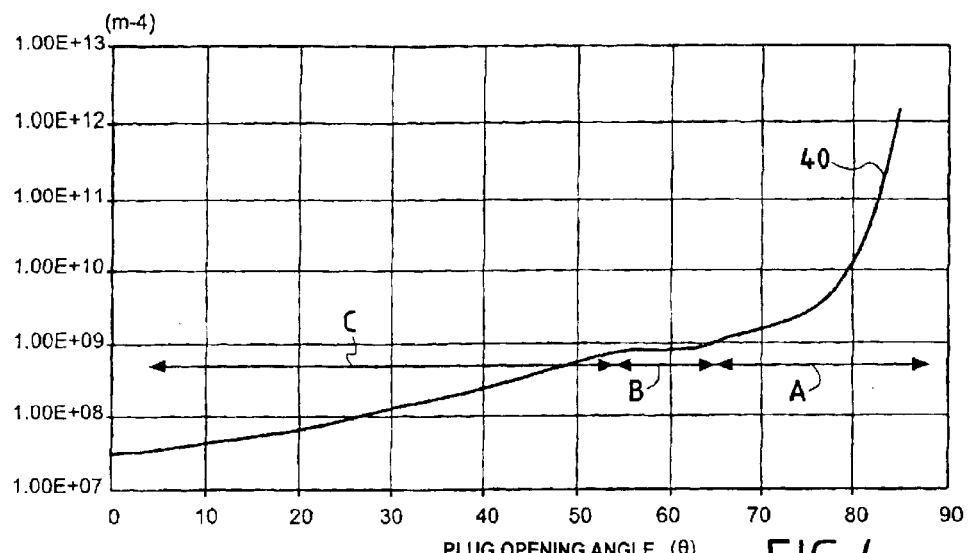
FIG. 4 is a graph showing hydraulic characteristics of the valve device of the invention in correspondence with FIGS. 3A, 3B, and 3C.

In a first stage A, corresponding to the first instants of the plug opening, the secondary opening 22 begins by passing beyond the annular gasket 10, as shown in FIG. 3A. The fluid which was previously blocked in the upstream portion 31 of the duct 30 then begins to flow between the upstream portion 31 and the downstream portion 32 by passing through the main opening 21 on the upstream side and exiting through the secondary opening 22 situated on the other side of the gasket 10, i.e. on the downstream side 32 of the duct. With reference to FIG. 4, this first stage A corresponds to a beginning of head loss in the duct which is due solely to the secondary opening 22 since at this stage this is the only opening to have gone beyond the gasket.

Figure 3B:
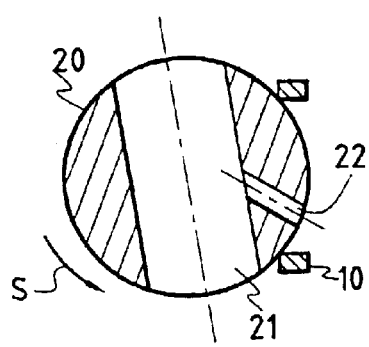

The following stage is a transient opening stage B in which, as shown in FIG. 3B, the opening 22 has passed fully to the other side of the gasket 10. This flow stage B corresponds to a "dwell" in which fluid flow is substantially constant. The size, or more precisely in this embodiment the diameter of the opening 22 determines the head-loss level of the dwell. In addition, the length of this dwell is a function of the spacing between the secondary opening 22 and the main opening 21, which for a spherical plug such as the plug 20 is determined by the angle b formed between the two openings in a plane perpendicular to the pivot axis of the plug.

Given that the valve device of the invention has only one gasket between the plug and the fluid flow duct, a single secondary opening offset from the main opening along the plug already serves to obtain control over the fluid flow rate, and consequently to obtain a flow stage in which head loss is smaller than that produced via the main opening. As shown in FIG. 3B, the fluid present at the upstream side of the duct is also present all around the outside wall of the plug that does not lie within the space defined on the downstream side of the gasket 10. The fluid thus enters on the upstream side via the main opening 21 but leaves on the downstream side solely via the secondary opening 22, thus determining the fluid flow rate through the valve in this stage of opening. Consequently, in the invention, it is possible to obtain a valve of controlled hydraulic characteristic by modifying one side only of the plug.

Figure 3C:
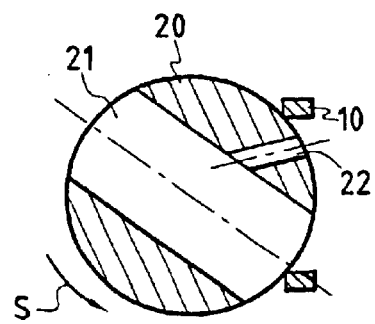

As shown in FIG. 3C, the third stage corresponds to the stage C in which the main opening 21 defining an orifice that is larger than that of the secondary opening 22 moves in turn past the annular gasket 10. The influence on the flow of the opening 22 then becomes negligible compared with the main flow via the opening 21. During this stage, the hydraulic characteristic depends mainly on the shape of the main opening 21.

Thus, unlike the characteristic shown in FIG. 12 for a conventional type of plug valve device, the hydraulic characteristic of the device of the invention is controlled, so that a plurality of flow stages are obtained between the maximum level of head loss when the valve is in the closed position and the minimum level of head loss when the valve is open.

The dwell obtained during flow stage B reappears when closing the plug and thus the valve. In other words, the flow stages A, B, and C that are obtained while opening the valve, reappear in the opposite order while closing it. Consequently, the valve device of the invention is controlled, hydraulically speaking, both during opening and during closing of the valve.

For a valve in which the gasket 10 is disposed on the other side of the plug, i.e. between the upstream portion 31 of the duct and the outside wall of the plug, the secondary opening needs to be placed on the other side of the main opening symmetrically about the axis thereof so as to obtain the same flow stages as those described above for a valve where the gasket is disposed on the downstream side of the duct.

Figure 5A:
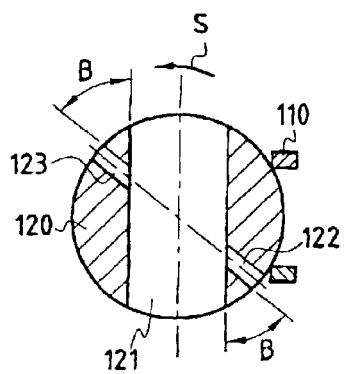
FIGS. 5A, 5B, 5C, and 5D are diagrammatic section views showing a plug in different positions for a second embodiment of the invention.
Figure 5C:
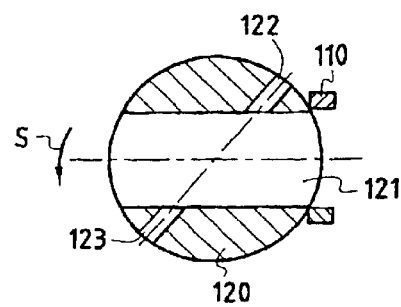
Figure 5B:
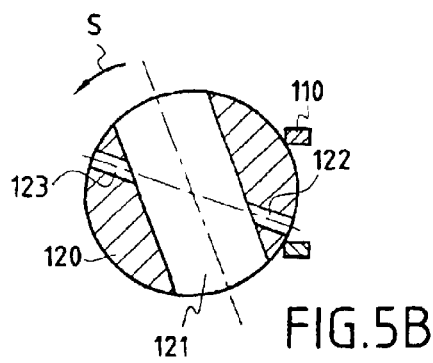
Figure 5D:
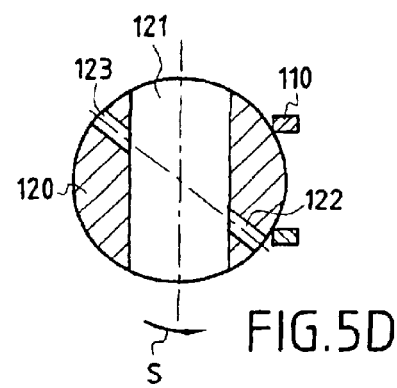

In a second embodiment of the invention, the valve device is fitted with a rotary plug which always turns in the same direction, e.g. under drive from an electrical actuator. In this embodiment, as shown in FIGS. 5A to 5D, a plug 120 has a main opening 121 and first and second secondary openings 122 and 123. The first and second secondary openings 122 and 123 are substantially in alignment on a common axis in the same plane as the main opening 121. These two secondary openings can be obtained, for example, by drilling a single hole right through the plug, and passing through the main opening 121. Thus, with a plug of such a configuration and by turning the plug continuously in the same direction S, it is possible to obtain a hydraulic characteristic on closing that is different from that which is obtained on opening. With reference to FIGS. 5A to 5D and the curve 50 shown in FIG. 6 giving head loss as a function of the opening angle of the plug 120, it can be seen that in an "opening" first stage which corresponds to the plug turning from an angle of 0° as shown in FIG. 5A to an angle of 90° as shown in FIG. 5C, the hydraulic characteristic 50 has a dwell 51 due to the first secondary opening 122 having gone to the other side of the gasket 110, as shown in FIG. 5B. Thereafter, in a "closure" second stage, corresponding to continued turning of the plug from the position shown in FIG. 5C (plug opening angle of 90°) to a position shown in FIG. 5D (plug opening angle of 180°) in which the duct is closed, a conventional hydraulic characteristic is obtained that differs from that obtained for the plug having an opening angle lying in the range 0° to 90°. Consequently, by continuing to turn the plug in the same direction S, the two hydraulic characteristics shown in FIG. 6 are obtained in alternation.

In a third embodiment of the invention, shown in FIG. 7, the valve device has a plug 220 with a main opening 221 and a secondary opening 222 which is offset from the main opening 221 by a distance L and lies parallel thereto. The hydraulic characteristic then obtained when turning the plug 220 relative to the gasket 210 is substantially the same as that shown in FIG. 4.

The device of the invention is not limited to a plug having one or two secondary openings situated in an equatorial plane of the plug. The number, the location relative to the main opening, and the shape of secondary openings depend respectively on the number of dwells, the length of each dwell, and the desired levels of head loss.

The two embodiments described above can thus be further modified depending on those parameters to obtain specific hydraulic characteristics.

In a fourth embodiment of the invention, as shown in FIG. 8, a spherical plug 320 has a main opening 321, first and second secondary openings 322 and 323 of cylindrical shape, and a third secondary opening 324 of rectangular shape. FIG. 9 shows the various hydraulic characteristics obtained in terms of head loss coefficient K as a function of the opening angle q of the plug. It can be seen that the curve 60 of FIG. 9 presents three dwells 61 obtained between a closed position and an open position, said dwells being obtained respectively by the secondary openings 322, 323, and 324. The levels of these dwells depend on the diameter or the flow section represented by each secondary opening. The lengths of the dwells 61 in the curve 60 depend on the spacing that exists between each (secondary or main) opening as measured in this case in a plane perpendicular to the axis of rotation, which spacings determine during opening or closure of the plug in the duct the length of the flow stage generated by each one of the openings. The various dwells obtained may also be extended by holding the plug in an intermediate position between a closed position and an open position so that the fluid flows only via one or more secondary openings. The slope DK/Dq can be controlled as a function of the shape, the position on the plug, and the size of the opening concerned. For example, with respect to the shape and the size of an opening, the curve 60 shows a steep slope between the two dwells that are closest to the open position which is due to the main opening 321 of triangular shape going beyond the gasket. The triangular shape of the main opening 321 serves to reduce or increase the slope of the curve 60 depending on the direction in which the plug is turned.

Furthermore, in order to illustrate the influence of the position of a secondary opening on the plug, there can be seen a "dip" 62 which appears in the curve when the opening angle is close to the closed position of the plug. Such a dip in the behavior of the head-loss coefficient can be obtained, for example, by the opening 323 which is situated on a non-equatorial plane in the surface of the plug 320 passing into the open space as defined by the gasket.

As the plug 320 turns, the opening 323 which is offset from the equatorial plane of the plug in which the main opening 321 is situated, moves into the open space defined by the gasket, thereby reducing the head-loss coefficient K. Thereafter, the opening 323 moves out from the open space before the main opening 321 has moved into the open space, thereby causing the coefficient K to increase. Such secondary openings can thus be disposed in a non-equatorial plane of the plug, thereby making it possible to obtain a reversal in the direction of the hydraulic characteristic such as the "dip" 62 in the curve 60.

The embodiments of the valve device of the invention as described above are naturally not limiting. Depending on the desired application, it is possible to vary the number of secondary flow openings, the shapes of the flow openings which can be cylindrical, rectangular, oval, arbitrary, . . . or the locations of the openings on the plug.

In addition, although it is advantageous for the plug to be spherical in shape in certain applications, in particular in cryogenic applications, the invention can be applied without any additional technical difficulty to valve devices in which the plug is cylindrical, conical, or of some other shape, depending on requirements.

Furthermore, the present invention can be implemented in valve devices of linear type. FIG. 10 shows a plug 420 for opening or closing a duct in a linear type of valve device. The plug 420 moves back and forth in linear translation between a closed position where its solid portion shuts off the valve duct, and an open position in which a main flow opening 421 co-operates with the duct. A secondary opening 422 offset by a length L parallel to the main opening 421 enables the hydraulic characteristics of the valve device to be controlled in the same manner as when using spherical plug valve devices as described above. All of the variations envisaged concerning the characteristics of the secondary openings (location, size, shape, number, . . . ) for rotary plug devices also apply to valve devices of linear type.

What is claimed is:

1. A valve device comprising a valve body defining a fluid flow duct, said duct having an upstream portion and a downstream portion between which there is disposed a plug having a main flow opening, the plug being movable between a first position in which the main flow opening co-operates with the flow duct, and a second position in which the plug closes said duct; a single annular gasket defining a sealed limit and an internal space, and providing sealing between the duct and an outside wall of the plug; said plug further including at least one secondary flow arrangement offset relative to said main flow opening so that when said plug is in an intermediate position between the open and closed positions, only the secondary flow arrangement is present in the internal space of the gasket so that the fluid flows exclusively via the secondary flow arrangement on one side of the sealed limit defined by the gasket and via the main opening on the other side of said limit.

2. The valve device according to claim 1, wherein the annular gasket is disposed between the outside wall of the plug and the downstream portion of the duct, the secondary flow arrangement being formed in the plug beside the downstream portion of the duct.

3. The valve device according to claim 1, wherein the annular gasket is disposed between the outside wall of the plug and the upstream portion of the duct, the secondary flow arrangement being formed in the plug beside the upstream portion of the duct.

4. The valve device according to claim 1, wherein said secondary flow arrangement has a shape and size which are calibrated as a function of a desired level of head loss.

5. The valve device according to claim 1, wherein the value of a spacing between said secondary flow arrangement and said main flow opening in the plane of motion of the plug is a function of the duration of a flow stage produced via the secondary flow arrangement.

6. The valve device according to claim 1, wherein said secondary flow arrangement comprises an opening disposed between the outside surface of the plug and a cavity defined by the main flow opening.

7. The valve device according to claim 1, wherein the plug has a diameter, and said secondary flow arrangement comprises first and second openings disposed between the outside wall of the plug and a cavity defined by the main flow opening, said first and second openings being substantially in alignment along an axis defined by the diameter of the plug.

8. The valve device according to claim 1, wherein said secondary flow arrangement comprises a plurality of openings disposed between the outside wall of the plug and a cavity defined by said main flow opening.

9. The valve device according to claim 1, wherein said secondary flow arrangement is disposed in a plane that is inclined relative to a plane defined by the main flow opening.

10. The valve device according to claim 1, wherein said plug outside wall is spherical in shape.

11. The valve device according to claim 1, wherein said plug outside wall is cylindrical in shape.

12. The valve device according to claim 1, wherein said plug outside wall is conical in shape.

13. The valve device according to claim 1, including a drive device connected to the plug and arranged to move said plug between an open position and a closed position.

14. The valve device according to claim 13, wherein said drive device is arranged so as to turn said plug to rotate continuously in the same direction.

15. The valve device according to claim 1, wherein said fluid flow duct is arranged to conduct a liquid.

* * * * *